(12) United States Patent
Burgess et al.

(10) Patent No.: US 10,279,250 B2
(45) Date of Patent: May 7, 2019

(54) GAMES CONTROLLER AND TRIGGER THEREFOR

(71) Applicant: Ironburg Inventions Ltd., Wincanton, Somerset (GB)

(72) Inventors: Simon Burgess, Cossington (GB); Duncan Ironmonger, Atlanta, GA (US)

(73) Assignee: Ironburg Inventions Ltd., Somerset (GB)

( * ) Notice: Subject to any disclaimer, the term of this patent is extended or adjusted under 35 U.S.C. 154(b) by 439 days.

(21) Appl. No.: 14/911,524

(22) PCT Filed: Jul. 10, 2014

(86) PCT No.: PCT/EP2014/064875
§ 371 (c)(1),
(2) Date: Feb. 11, 2016

(87) PCT Pub. No.: WO2015/004261
PCT Pub. Date: Jan. 15, 2015

(65) Prior Publication Data
US 2016/0193529 A1 Jul. 7, 2016

Related U.S. Application Data

(60) Provisional application No. 61/844,548, filed on Jul. 10, 2013.

(51) Int. Cl.
*A63F 13/24* (2014.01)
*A63F 13/20* (2014.01)

(52) U.S. Cl.
CPC .............. *A63F 13/24* (2014.09); *A63F 13/20* (2014.09); *A63F 2300/1043* (2013.01)

(58) Field of Classification Search
CPC ... A63F 13/24; A63F 13/20; A63F 2300/1043
See application file for complete search history.

(56) References Cited

U.S. PATENT DOCUMENTS

| 4,032,728 A | 6/1977 | Oelsch |
| 5,451,053 A | 9/1995 | Garrido |

(Continued)

FOREIGN PATENT DOCUMENTS

| EP | 1852162 | 11/2007 |
| EP | 2 479 636 | 7/2012 |

(Continued)

OTHER PUBLICATIONS

WIPO, International Preliminary Report on Patentability, PCT/EP2014/064875 (2016).

(Continued)

*Primary Examiner* — James S McClellan
*Assistant Examiner* — Peter Iannuzzi
(74) *Attorney, Agent, or Firm* — Walters & Wasylyna LLC

(57) ABSTRACT

A game controller for controlling electronic games comprising: a controller chassis and an actuator system including: an actuator body; an actuator mechanism chassis; a detent chassis comprising at least one detent for arresting movement of the actuator body to create an end stop to limit the actuator movement; wherein the detent chassis is rotationally mounted within the actuator body such that the detent chassis can be rotated between at least a first position in which said at least one detent is in a stowed condition and at least a second position in which one of said at least one detent is in a deployed condition.

14 Claims, 16 Drawing Sheets

(56) References Cited

U.S. PATENT DOCUMENTS

| | | |
|---|---|---|
| 5,773,769 A | 6/1998 | Raymond |
| 5,841,372 A | 11/1998 | Matsumoto |
| 5,874,906 A | 2/1999 | Willner et al. |
| 5,989,123 A | 11/1999 | Tosaki et al. |
| 6,251,015 B1 | 6/2001 | Caprai |
| 6,512,511 B2 | 1/2003 | Willner et al. |
| 6,752,719 B2 | 6/2004 | Himoto et al. |
| 6,760,013 B2 | 7/2004 | Willner et al. |
| 7,510,477 B2 | 3/2009 | Argentar |
| 7,758,424 B2 | 7/2010 | Riggs et al. |
| 7,859,514 B1 | 12/2010 | Park |
| 8,496,528 B2 * | 7/2013 | Muramatsu ............ A63F 13/24 463/37 |
| 8,641,525 B2 | 2/2014 | Burgess et al. |
| 8,777,620 B1 | 7/2014 | Baxter |
| 9,089,770 B2 | 7/2015 | Burgess et al. |
| 9,804,691 B1 | 10/2017 | Strahle et al. |
| 2001/0003713 A1 | 6/2001 | Willner et al. |
| 2001/0025778 A1 | 10/2001 | Ono |
| 2002/0052237 A1 | 5/2002 | Magill |
| 2002/0128064 A1 | 9/2002 | Sobota |
| 2003/0067111 A1 | 4/2003 | Swan |
| 2004/0259059 A1 | 12/2004 | Aoki |
| 2005/0083297 A1 | 4/2005 | Duncan |
| 2005/0255918 A1 | 11/2005 | Riggs et al. |
| 2006/0025217 A1 | 2/2006 | Hussaini et al. |
| 2006/0116204 A1 * | 6/2006 | Chen ............ A63F 13/06 463/37 |
| 2008/0261695 A1 * | 10/2008 | Coe ............ A63F 13/24 463/37 |
| 2009/0088250 A1 | 4/2009 | Carlson |
| 2009/0258705 A1 | 10/2009 | Guinchard |
| 2010/0073283 A1 | 3/2010 | Enright |
| 2010/0267454 A1 | 10/2010 | Navid |
| 2010/0304865 A1 | 12/2010 | Picunko |
| 2011/0256930 A1 | 10/2011 | Jaouen |
| 2011/0281649 A1 | 11/2011 | Jaouen |
| 2012/0088582 A1 | 4/2012 | Wu et al. |
| 2012/0142418 A1 | 6/2012 | Muramatsu |
| 2012/0142419 A1 | 6/2012 | Muramatsu |
| 2012/0299244 A1 | 11/2012 | Rice et al. |
| 2012/0322553 A1 | 12/2012 | Burgess et al. |
| 2012/0322555 A1 | 12/2012 | Burgess et al. |
| 2013/0147610 A1 | 6/2013 | Grant et al. |
| 2013/0150155 A1 | 6/2013 | Barney et al. |
| 2013/0196770 A1 | 8/2013 | Barney et al. |
| 2014/0274397 A1 | 9/2014 | Sebastian |
| 2015/0234479 A1 | 8/2015 | Schantz et al. |
| 2015/0238855 A1 | 8/2015 | Uy et al. |
| 2016/0082349 A1 | 3/2016 | Burgess et al. |
| 2016/0193529 A1 | 7/2016 | Burgess et al. |
| 2016/0346682 A1 | 12/2016 | Burgess et al. |
| 2017/0001107 A1 | 1/2017 | Burgess et al. |
| 2017/0001108 A1 | 1/2017 | Burgess et al. |
| 2017/0087456 A1 | 3/2017 | Burgess et al. |
| 2017/0151494 A1 | 6/2017 | Ironmonger et al. |
| 2017/0157509 A1 | 6/2017 | Burgess et al. |

FOREIGN PATENT DOCUMENTS

| | | |
|---|---|---|
| EP | 2 698 185 | 2/2015 |
| GB | 2 244 546 | 12/1991 |
| GB | 2 481 633 | 1/2012 |
| JP | H1020951 | 1/1998 |
| WO | WO 2008/131249 | 10/2008 |
| WO | WO2014/187923 | 11/2014 |
| WO | WO2015/004261 | 1/2015 |
| WO | WO2015/110553 | 7/2015 |

OTHER PUBLICATIONS

International Search Report, PCT/EP2014/060587 (2014).
International Search Report, PCT/EP2015/058096 (2015).
Written Opinion of the International Searching Authority, PCT/EP2015/058096 (2015).
Burns, "Review: Scuf Xbox 360 Controller," Xboxer360.com (2010).
Combined Search and Examination Report, GB1011078.1 (2011).
"Rapid Fire Mod for Wireless Xbox 360 Controller," forum on xbox-scene.com, (2008).
"Thrustmaster USB game controller roundup," dansdata.com/tmsticks.htm (2002).
Coles, Olin, "Thrustmaster Run-N-Drive PC/PS3 Wireless Gamepad" BenchmarkReviews.com (2009).
Office Action, U.S. Appl. No. 14/832,211 (2015).
Office Action, U.S. Appl. No. 14/736,771 (2015).
Office Action, U.S. Appl. No. 14/805,597 (2015).
Office Action, U.S. Appl. No. 14/805,641 (2015).
Corrected Petition for Inter Partes Review of U.S. Pat. No. 9,089,770, Under 37 C.F.R. § 42.100, filed by Valve Corporation, Case IPR2016-00949 (2016).
Corrected Petition for Inter Partes Review of U.S. Pat. No. 8,641,525, Under 37 C.F.R. § 42.100, filed by Valve Corporation, Case IPR2016-00948 (2016).
Xbox 360 Wireless Controller Tour, published on May 13, 2005 at http://www.ign.com/articles/2005/05/13/xbox-360-wireless-controller-tour.

* cited by examiner

GAMES CONTROLLER AND TRIGGER THEREFOR

This application is a U.S. national phase application of Intl. App. No. PCT/EP2014/064875 filed on Jul. 10, 2014, which claims priority from U.S. Ser. No. 61/844,548 filed on Jul. 10, 2013. The entire contents of Intl. App. No. PCT/EP2014/064875 and U.S. Ser. No. 61/844,548 are incorporated herein by reference.

TECHNICAL FIELD

The invention relates to controllers for controlling the play of computerised games and to a trigger mechanism for a games controller. More particularly, but not exclusively, the invention relates to an adjustable actuator system, such as a trigger button, of a game controller for a gaming console and to a method of adjusting the range of travel of an actuator.

BACKGROUND

There are many different types of gaming consoles currently available for operating a video game. For example, Microsoft®, Sony® and Nintendo® manufacture the Xbox®, PlayStation® and Wii® gaming consoles, respectively. The gaming consoles typically include a game controller so that a user can control the operation of the video game.

Some known game controllers include a form of actuator system for the operation of control of the functions of the video games. Actuators, buttons or other depressible or manually operable devices are typically used for controlling discrete actions such as the firing of a weapon or an attack command. It is known to provide a button or actuator which is intended to be operable by the index finger of a user; such buttons are commonly known as triggers.

At times, dependent upon the video game being played, it can be necessary to depress the trigger a distance before the trigger initiation point is reached and the command actually acknowledged. This renders part of the depressing action futile. Likewise, after the command has been operated, it is often possible to carry out further depression of the trigger past the trigger initiation point. This further depression is unnecessary and may also be disadvantageous.

Furthermore, in other situations in some video games, the strength of a command is increased or decreased dependent upon how frequently the trigger is depressed. As such, depressing the trigger the whole distance is unnecessary and excessive for the command or operation required.

It is desirable to have a controller, particularly for gaming applications, that is more responsive or has less scope for allowing unnecessary over-movement by the user of the controller. It is also desirable to provide a trigger mechanism which can be readily adjusted dependent upon the game being controlled to alter the degree of travel of the trigger mechanism.

Due to the rapidly expanding gaming market and development of involved games invoking considerable player input, it is desirable for players to be able to customise their controllers in order to gain increased control in a variety of gaming circumstances.

The present invention seeks to improve upon or at least mitigate some of the problems associated with controllers of the prior art by providing a game controller, which includes an adjustable trigger system that has a mechanism to allow the end user to control or recalibrate the maximum and/or minimum trigger positions.

SUMMARY

There is a variety of different commands available for the trigger functions of a game controller, and the adjustable trigger system of the present invention now provides users with the option to customise the trigger settings to suit the individual game at the time of operation.

In some embodiments the trigger system includes adjustments for the amount that the trigger is depressed before there is no more motion available to be made by the operator. This removes any unnecessary distance travelled by the trigger.

The present invention provides a method of controlling the amount of available motion of a trigger system dependent upon the gaming circumstances.

According to a first aspect of the invention, there is provided an apparatus for supplying user inputs to a computer program, such as a game program, for controlling the game program, the apparatus comprising at least one depressible trigger mechanism, the trigger mechanism comprising a trigger body having a mechanism for manual adjustment of the depressible range of the trigger mechanism mounted therein.

Optionally, the mechanism for manual adjustment of the depressible range of the trigger mechanism comprises a stopping block having at least two faces, at least one of said faces having a projection extending outwardly from the trigger body for arresting the motion of the trigger mechanism thereby reducing the depressible range of the trigger mechanism.

Optionally, the apparatus comprises a chassis, and at least a portion of the trigger mechanism protrudes through an aperture in the chassis, and wherein the projection comprises a shoulder which engages with an edge of the chassis defined by the aperture.

Optionally, the stopping block comprises a smooth face so as to allow unencumbered motion of the trigger mechanism thereby allowing depression of the trigger mechanism through its full range of motion.

Optionally, the mechanism for manual adjustment of the depressible range of the trigger mechanism comprises a stopping block having a plurality of faces, each of said faces defining a predetermined range of motion of the trigger mechanism.

Optionally, the mechanism for manual adjustment of the depressible range of the trigger mechanism provides a plurality of discrete predefined ranges of motion of the trigger body.

Optionally, the mechanism for manual adjustment of the depressible range of the trigger mechanism comprises a stopping block having at least two faces, and the trigger body comprises an aperture or cutaway, wherein at least one of said faces has a projection which extends outwardly through the aperture or cutaway in the trigger body such that the projection arrests the motion of the trigger mechanism thereby reducing the depressible range of the trigger mechanism.

Optionally, the stopping block may be rotationally mounted within the trigger body.

Optionally, the stopping block is securable in a given orientation with respect to the trigger body, such that one of said at least two faces may be presented through the aperture or cutaway.

Optionally, the stopping block is mounted upon a screw thread, which screw thread is mounted to the trigger body and wherein rotation of the screw thread causes the stopping block to be frictionally engaged with the trigger body thereby securing the trigger body in a selected orientation.

According to a second aspect of the invention, there is provided an apparatus for supplying user inputs to a computer program, such as a game program, for controlling the game program, the apparatus comprising at least one depressible trigger mechanism, the trigger mechanism comprising a trigger body having a mechanism for manual adjustment of the stop position of the trigger mechanism mounted therein.

According to a third aspect of the invention, there is provided a game controller for controlling electronic games, including a housing, at least one depressible trigger at least in part exposed relative to the housing, said at least one depressible trigger being in operational association with electrical circuitry contained within the housing, which electrical circuitry is controlled by depression of the or each depressible trigger for manipulating electrical outputs of the circuitry for controlling electronic games, the trigger comprising a trigger body having a mechanism for manual adjustment of the depressible range of the trigger mounted therein.

According to a fourth aspect of the invention, there is provided a game controller for controlling electronic games comprising:
  a controller chassis and an actuator system including:
    an actuator body;
    an actuator mechanism chassis;
    a detent chassis comprising at least one detent for arresting movement of the actuator body to create an end stop to limit the actuator movement;
    wherein the detent chassis is rotationally mounted within the actuator body such that the detent chassis can be rotated between at least a first position in which said at least one detent is in a stowed condition and at least a second position in which one of said at least one detent is in a deployed condition.

Optionally, the actuator is a trigger button.

Optionally, the detent chassis is removable from the actuator body.

According to a fifth aspect of the invention, there is also provided a trigger mechanism for a game controller for controlling electronic games comprising:
  a trigger body;
  a trigger mechanism chassis for mounting the trigger body to a game controller;
  a trigger range of travel control mechanism comprising:
    a detent chassis comprising at least one detent for arresting movement of the actuator body to create an end stop to limit the actuator movement;
    wherein the detent chassis is rotationally mounted within the actuator body such that the detent chassis can be rotated between at least a first position in which said at least one detent is in a stowed condition and at least a second position in which one of said at least one detent is in a deployed condition.

According to a sixth aspect of the invention, there is additionally provided a method of adjusting the range of movement of a button on a game controller for controlling electronic games comprising:
  providing a game controller including
    a controller chassis;
    a trigger body;
    a trigger mechanism chassis;
    a detent chassis comprising at least one detent for arresting movement of the actuator body to create an end stop to limit the actuator movement;
    wherein the detent chassis is rotationally mounted within the actuator body such that the detent chassis can be rotated between at least a first position in which said at least one detent is in a stowed condition and at least a second position in which one of said at least one detent is in a deployed condition;
  rotating the detent chassis to adjust the position of the end stop.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which.

DETAILED DESCRIPTION OF THE EMBODIMENTS

Detailed descriptions of specific embodiments of the games controller and its trigger mechanism are disclosed herein. It will be understood that the disclosed embodiments are merely examples of the way in which certain aspects of the invention can be implemented and do not represent an exhaustive list of all of the ways the invention may be embodied. Indeed, it will be understood that the games controller and its trigger mechanism described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
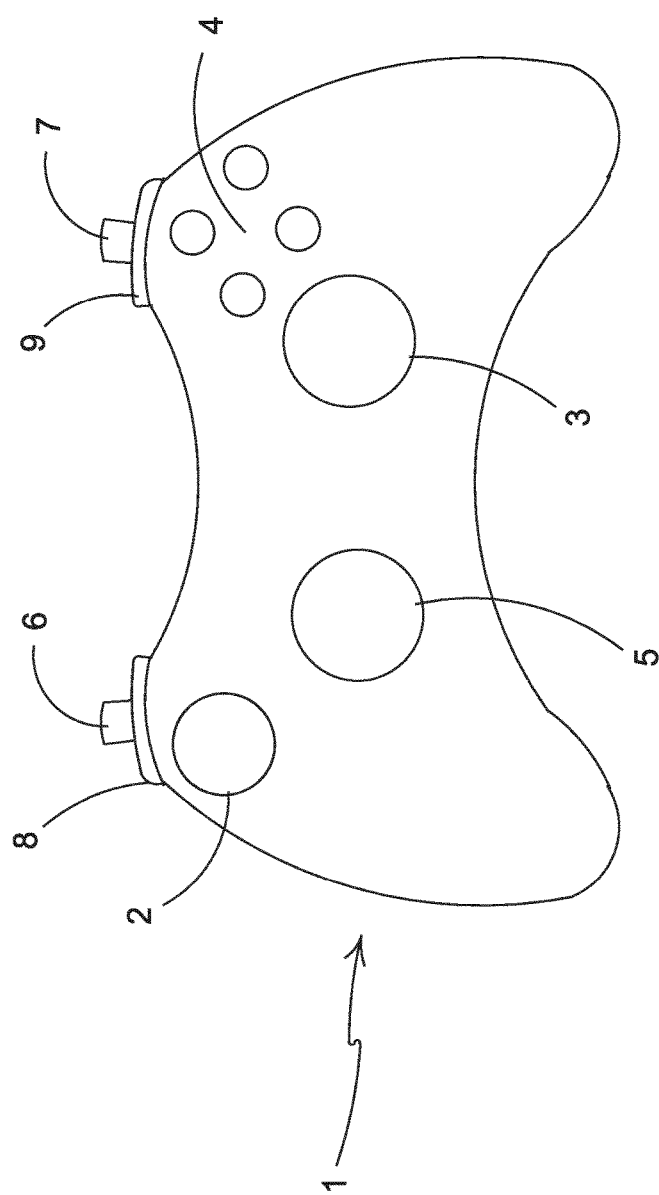
FIG. 1 is a schematic illustration from above of the front of a games console controller according to the present invention.
Figure 2:
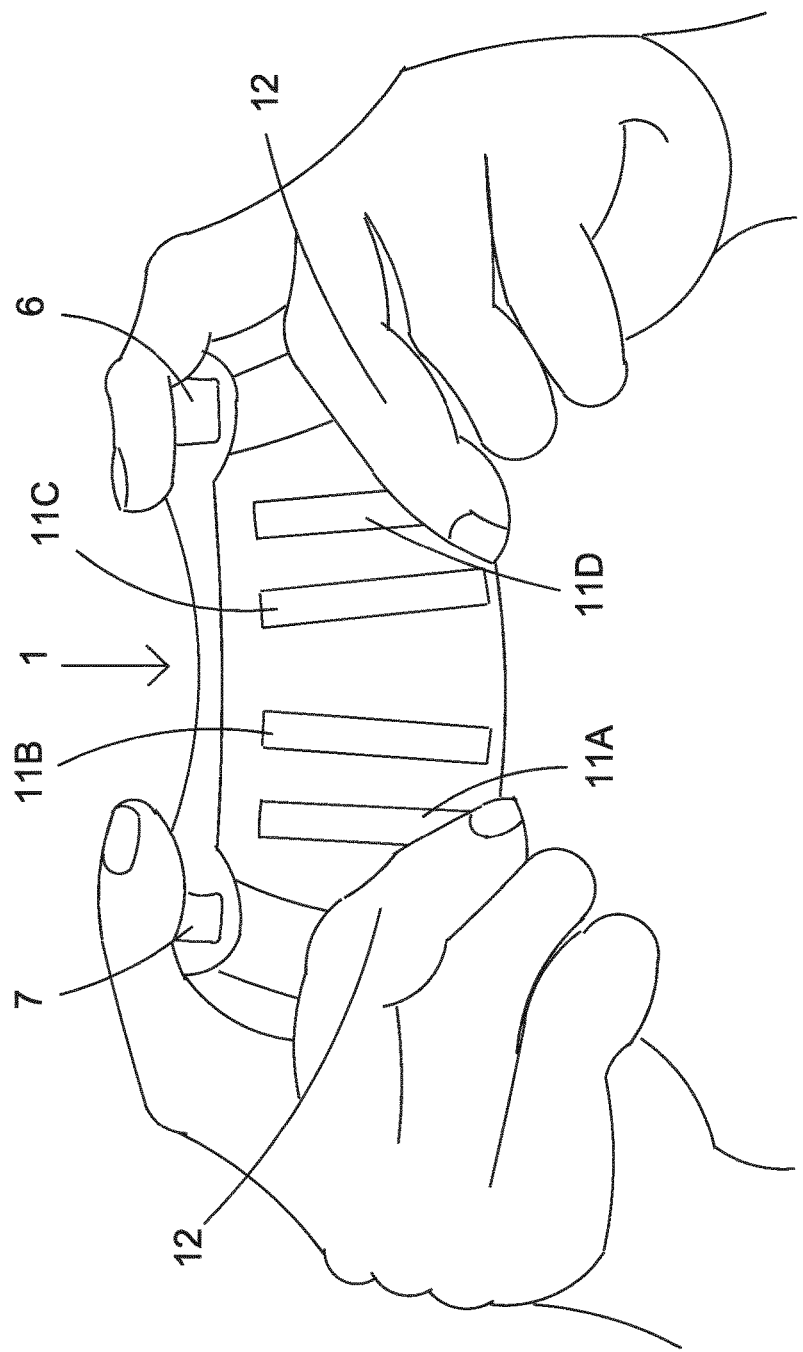
FIG. 2 is a schematic illustration from below of the rear of a games console controller according to the present invention, in use.

Referring to FIG. 1 there is shown a controller 1 according to an embodiment of the present invention. FIG. 1 shows the controls which are mounted on the front and top of the controller 1. Specifically, there are left and right analogue thumb sticks 2, 3 which normally control movement and are intended to be operated by the user's left and right thumbs respectively. There are four buttons 4, located on a front-right portion of the controller 1, which normally control additional actions and are intended to be operated by the user's right thumb. There is a direction pad 5 located on the lower portion of the front-left of the controller 1. The direction pad 5 is intended to be operated by the user's left thumb, typically either as an alternative to the left thumb stick 2 or to provide additional actions. There are a left trigger 6, a right trigger 7, a left bumper 8 and a right bumper 9 located on the front of the controller 1. The left and right triggers 6, 7 are typically operated by a user's index fingers, as shown in FIG. 2. The left and right bumpers 8, 9 may also be operated by a user's index fingers.

FIG. 2 illustrates a rear portion of the controller 1. Four paddle levers 11A, 11B, 11C, 11D are mounted to the rear of the controller 1. The paddle levers 11A, 11B, 11C, 11D are configured to replicate the function of one or more of the controls provided upon the front of the controller 1. The paddle levers 11A, 11B, 11C, 11D are mounted to a controller chassis member 14 by a fixing device 15 such as a screw or bolt.

Figure 3:
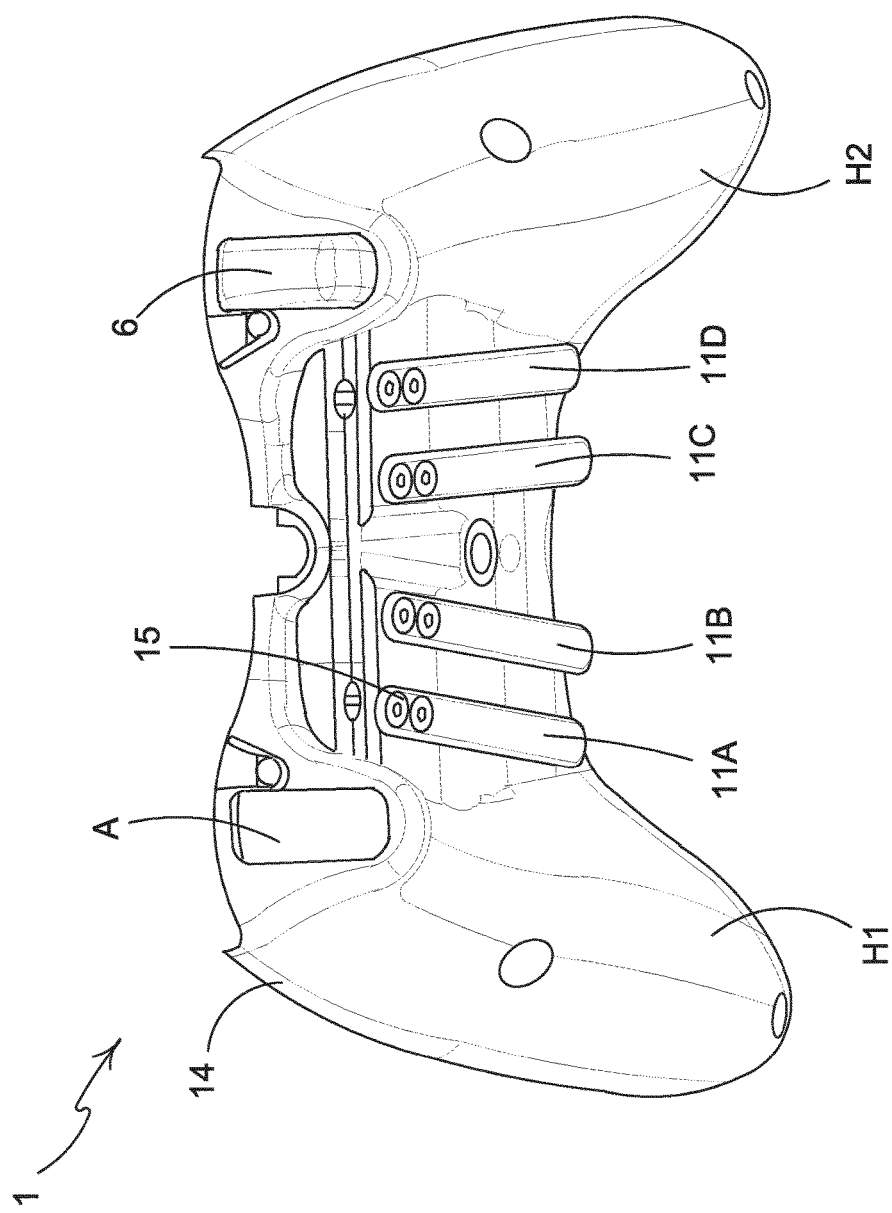
FIG. 3 is a perspective view from below of the rear panel of a games console controller according to a first embodiment.

The controller chassis member 14 defines a pair of handles H1, H2 which a user may grasp when operating the controller 1. The paddle levers 11A, 11B, 11C, 11D are configured to be operated by a middle finger 12 of an operator which is wrapped around the handles H1, H2. The controller chassis member 14 comprises a pair of apertures A in a front edge thereof. An actuator in the form of a trigger mechanism 10, see FIG. 8, extends through each aperture A. FIG. 3 illustrates a left trigger mechanism 10 extending through one of the apertures A.

Figure 4:
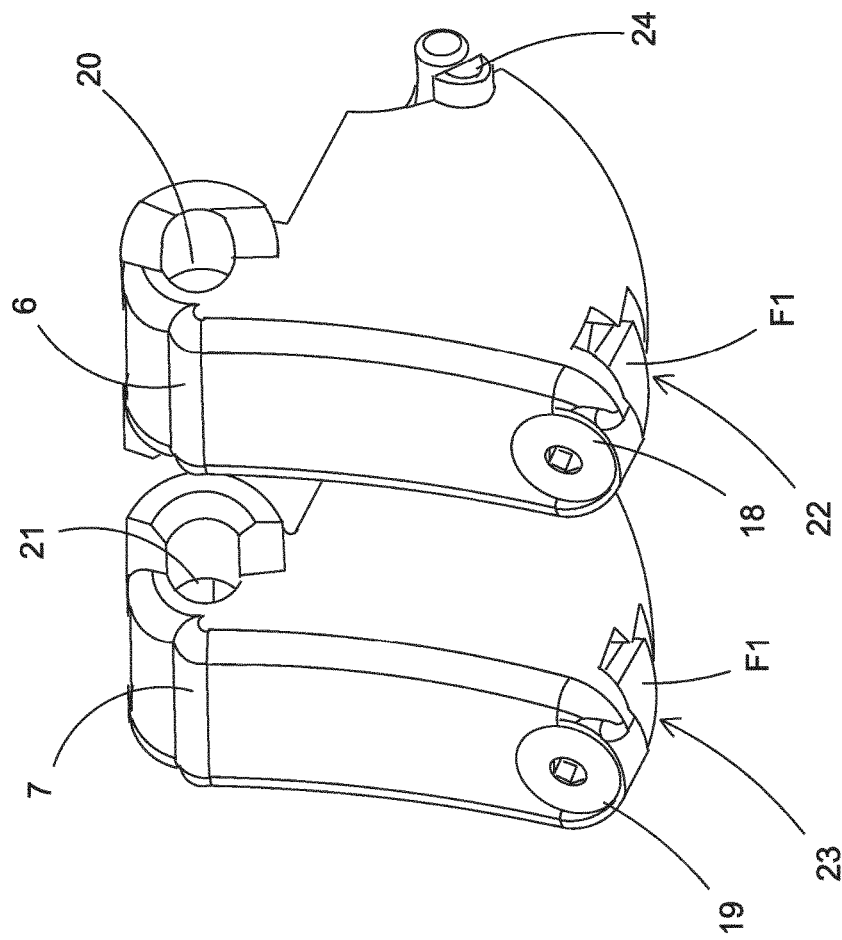
FIG. 4 is a perspective view from below of a trigger mechanism according to a first embodiment, in which a stop mechanism is in a first condition.
Figure 5:
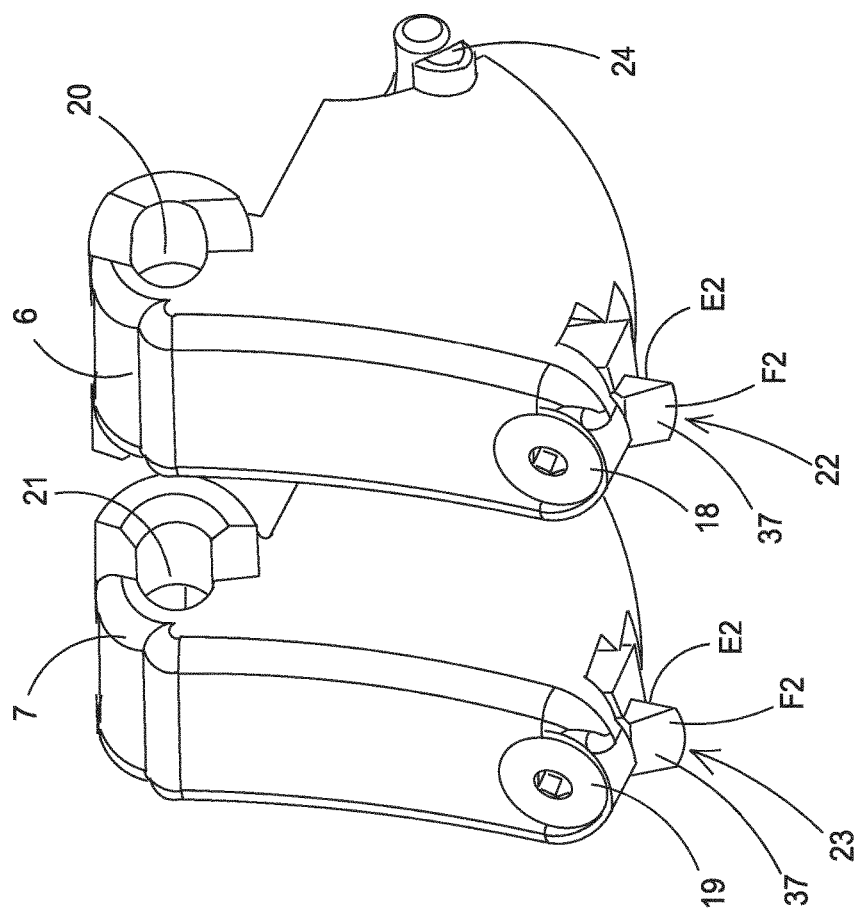
FIG. 5 is a perspective view from below of a trigger mechanism according to a first embodiment in which a stop mechanism is in a second condition.
Figure 6:
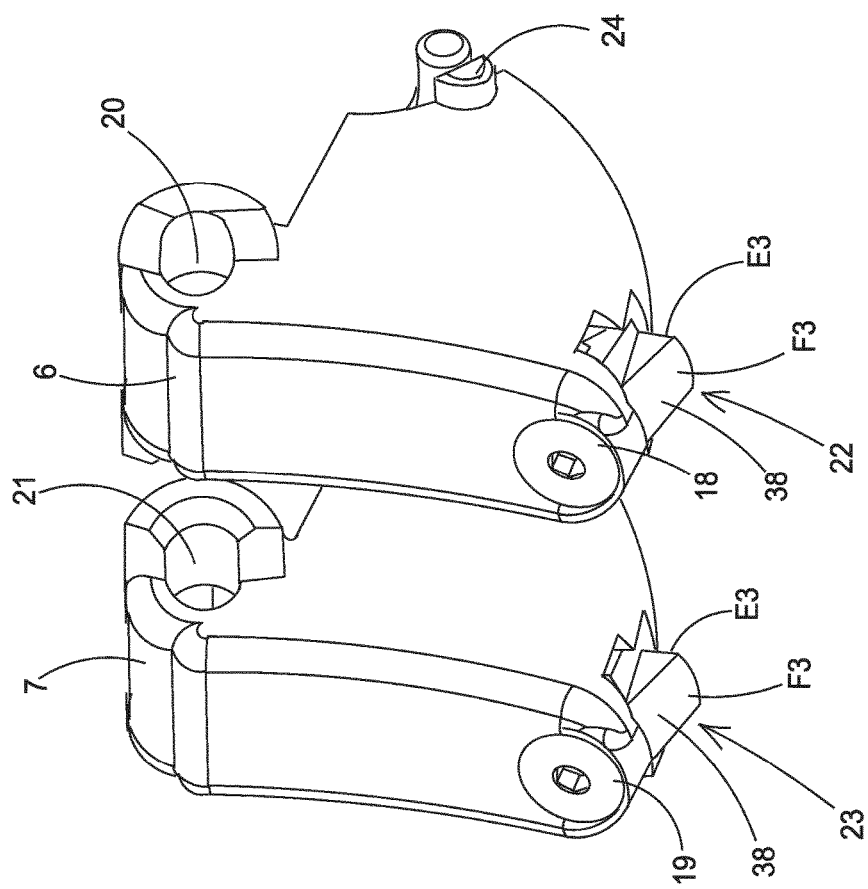
FIG. 6 is a perspective view from below of a trigger mechanism according to a first embodiment in which a stop mechanism is in a third condition.
Figure 8:
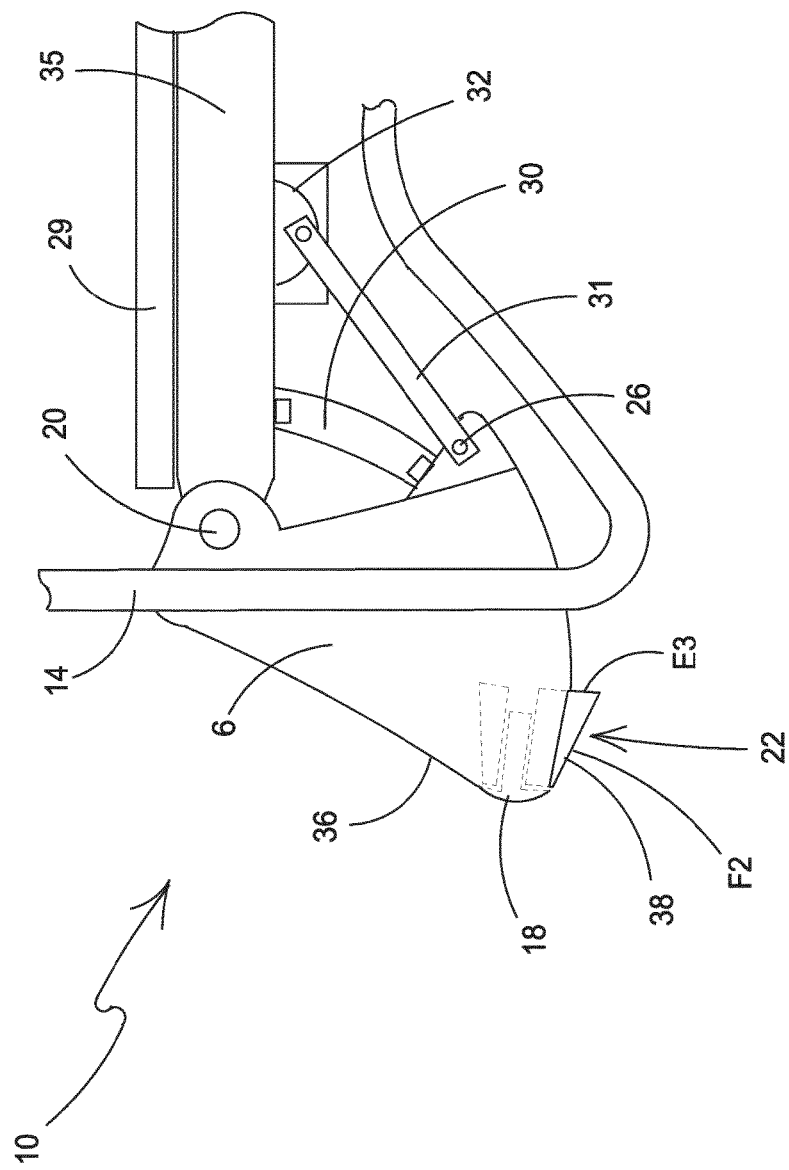
FIG. 8 is a cut-away side view of the trigger mechanism according to a first illustrated embodiment of the invention.
Figure 9B:
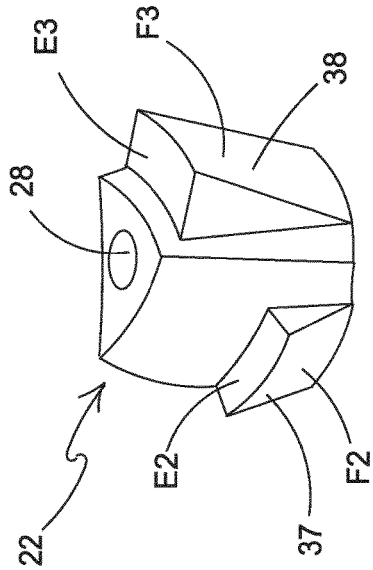
FIG. 9B is a perspective view from above of a component of the trigger mechanism according to the first embodiment.
Figure 9D:
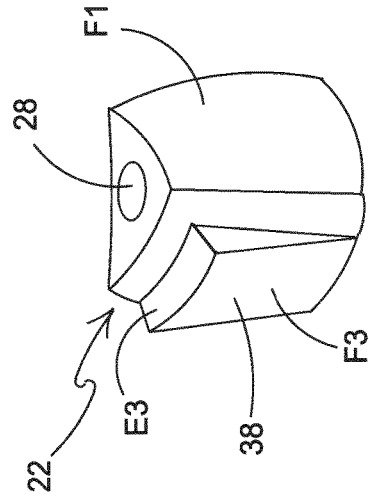
FIG. 9D is a perspective view from above of a component of the trigger mechanism according to the first embodiment.
Figure 9A:
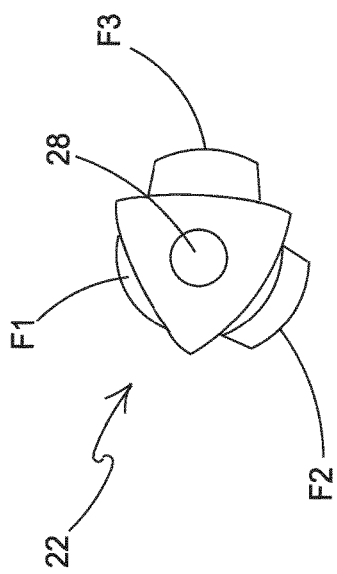
FIG. 9A is a plan view from above of a component of the trigger mechanism according to the first embodiment.
Figure 9C:
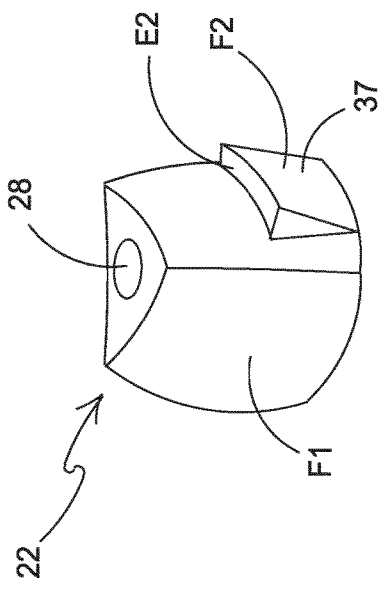
FIG. 9C is a perspective view from above of a component of the trigger mechanism according to the first embodiment.

FIGS. 4 to 6 illustrate a left trigger body 6 and a right trigger body 7 for mounting in the apertures A of the controller chassis member 14. Each of the left and right trigger mechanisms 6, 7 are mounted on a printed circuit board 29 by a trigger mechanism chassis 35, as shown in FIG. 8. The left trigger body 6 is pivotally mounted to the printed circuit board 29. The left trigger body 6 pivots about a pivot point. The left trigger body 6 comprises an aperture 20 which receives a shaft or bearing integrally formed with the trigger chassis mechanism 35 such that the left trigger body 6 is rotationally mounted thereto. The shaft 20 is mounted to the printed circuit board 29. The right trigger mechanism 7 is pivotally mounted to the printed circuit board 29. The right trigger body 7 pivots about a pivot point. The right trigger body 7 comprises an aperture 21 which receives a shaft or bearing integrally formed with the trigger chassis mechanism 35 such that the right trigger body 7 is rotationally mounted thereto. The shaft is mounted to the printed circuit board 29.

The trigger mechanism 10 is linked to a trigger motion sensor 32 by a link arm 31. The link arm 31 is pivotally mounted to the trigger mechanism 10 and to the trigger motion sensor 32. A biasing means in the form of a helical spring 30 biases the trigger mechanism 10 to return to a released or deactivated position. Depressing the trigger body 6 causes the link arm 31 to rotationally move a portion of the sensor 32. The rotational movement of this portion is detected by the sensor and represents a degree of travel of the trigger body 6.

Figure 7:
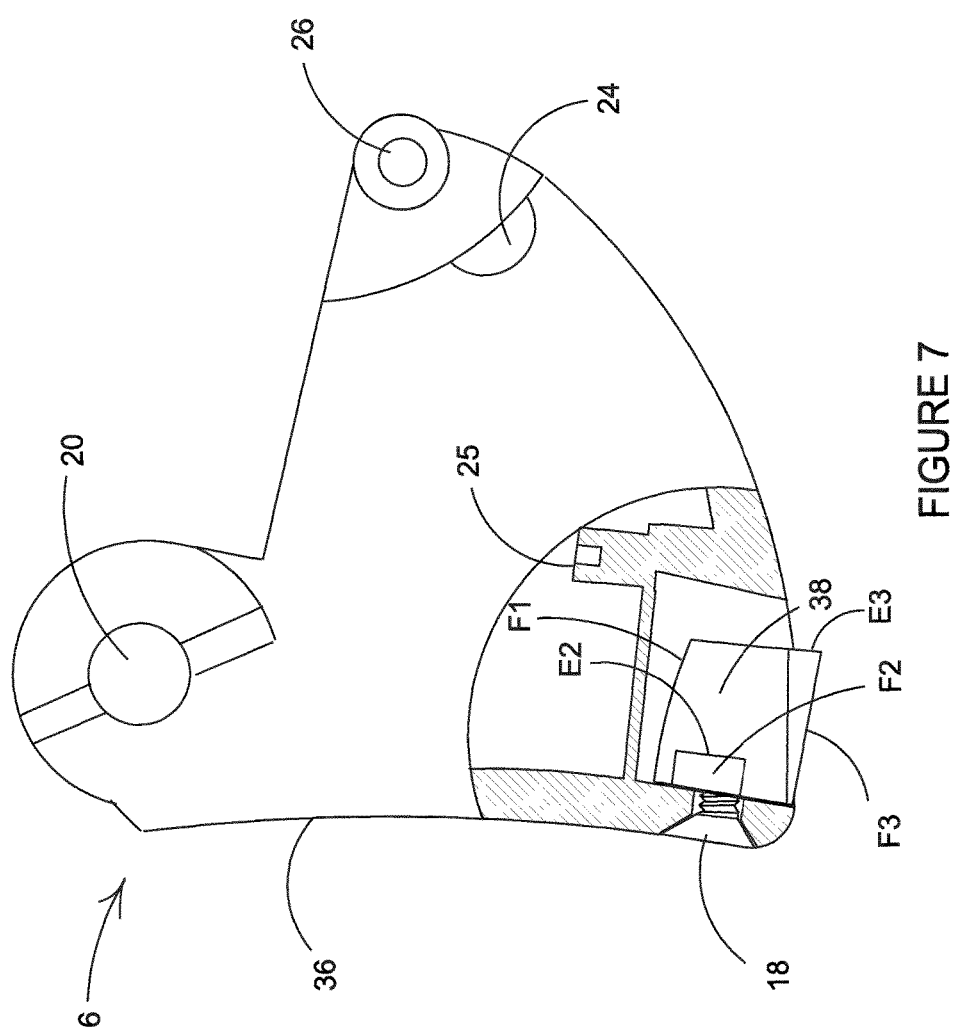
FIG. 7 is a perspective view from below of a trigger mechanism according to a first embodiment in which a portion of the trigger body is removed for illustrative purposes.

Referring to FIG. 7, there is illustrated a view of the trigger mechanism of a left trigger body 6 which is shown transparent; the right trigger body 7 is substantially the same in structure albeit a mirror image of the left trigger body 6. The left trigger body 6 comprises a biasing device mounting post 25. The biasing device mounting post 25 is inserted into a helical spring for biasing the left trigger body 6 to return to a start position. The left trigger body 6 comprises a shaft 26 integrally formed with the left trigger body 6. The shaft 26 is pivotally coupled to the link arm 31. The left trigger body 6 comprises an end stop 24 integrally moulded or formed with the left trigger body 6. The end stop 24 engages with the trigger chassis mechanism 35 to define the start position of the trigger body 6. The end stop 24 prevents the biasing device 30 from pushing the left trigger body 6 out of the controller chassis 14 and defines the start position of the left trigger body 6.

The trigger mechanism 10 comprises an adjustable stop mechanism 22 for manual adjustment of the depressible range of the trigger mechanism 10. FIGS. 4 to 6 show the left trigger body 6 including a first adjustable stop mechanism 22, and a right trigger body 7 including a second adjustable stop mechanism 23. The second adjustable stop mechanism 23 is substantially the same as the first adjustable stop mechanism 22, and therefore further description of the adjustable stop mechanisms 22, 23 will be made with reference to the first adjustable stop mechanism 22 of the left trigger body 6 only. The adjustable stop mechanism 22 is rotationally mounted within the trigger body 6. A fixing means in the form of a screw or bolt 18, including an external screw thread, passes through a front wall 36 of the trigger body 6. The fixing means is received in an aperture 28, see FIGS. 9A to 9D, in the adjustable stop mechanism 22. The adjustable stop mechanism 22 comprises a stopping block having three faces F1, F2, F3, each allowing a different degree of travel of the trigger body 6. The faces F1, F2, F3 of the adjustable stop mechanism 22 are configured to form a part of a bottom wall of the trigger body 6. The bottom of the trigger body 6 comprises an aperture or cutaway for receiving a portion of the adjustable stop mechanism 22.

The adjustable stop mechanism 22 can be locked or secured in position, presenting one of the three faces F1, F2, F3 to the bottom wall of the trigger body 6, by tightening the screw or bolt 18 such that the adjustable stop mechanism 22 is frictionally held, tightly, against the inner surface of the front wall 36 of the trigger body 6.

The adjustable stop mechanism 22 can be rotated with respect to the trigger body 6 to select one of the three faces F1, F2, F3 to be projected through the aperture in the bottom wall of the trigger body 6 by loosening the screw or bolt 18. Optionally, a tool can be provided for engaging with the screw or bolt 18 to facilitate tightening or loosening of the screw or bolt 18; for example, the tool may be an Allen key, or a hex or star driver, a cross head or flat head screwdriver, a spanner or a wrench, to turn the screw or bolt 18 thereby driving it into or out of the trigger body 6.

Referring now to FIGS. 10 to 16, there is shown an alternative embodiment of the present invention. In the second illustrated embodiment like numerals have, where possible, been used to denote like parts, albeit with the addition of the prefix "100" to indicate that these features belong to the second embodiment. The alternative embodiment shares many common features with the first embodiment and therefore only the differences from the embodiment illustrated in FIGS. 1 to 9D will be described in any greater detail.

The controller 101 of the second embodiment comprises only two paddle levers 111A, 111B. A first paddle lever 111A of the two paddle levers 111A, 111B is disposed on a first side of a battery pack chassis 133 and a second paddle lever 111B of the two paddle levers 111A, 111B is disposed on a second, opposing side of the battery pack chassis 133.

It will be appreciated that in still further embodiments the paddle levers 111A, 111B may be omitted.

The controller 1, 101 may communicate with a processing unit of a games console via a wired connection or a wireless connection.

Referring now to FIGS. 4 to 6 and FIGS. 9A to 16, operation of the adjustable stop mechanism 22 will now be described. The adjustable stop mechanism 22 comprises a first face F1 which allows the trigger body to be fully depressed by a user U. Face F1 comprises a smooth face, that is to say it is projection less, there are no protrusions which interfere with, or encumber, the travel of the trigger mechanism 10. Face F2 and face F3 comprise detents or projections 37, 38 which provide an interference fit with the controller chassis 14, thus restricting the degree of travel of the trigger body 6, 106. Projections 37, 38 each define an end stop of the travel of the trigger mechanism 10. Projections 37, 38 comprise shoulders or engaging surfaces E2, E3 which arrest the travel of the trigger mechanism 10.

Figure 10:
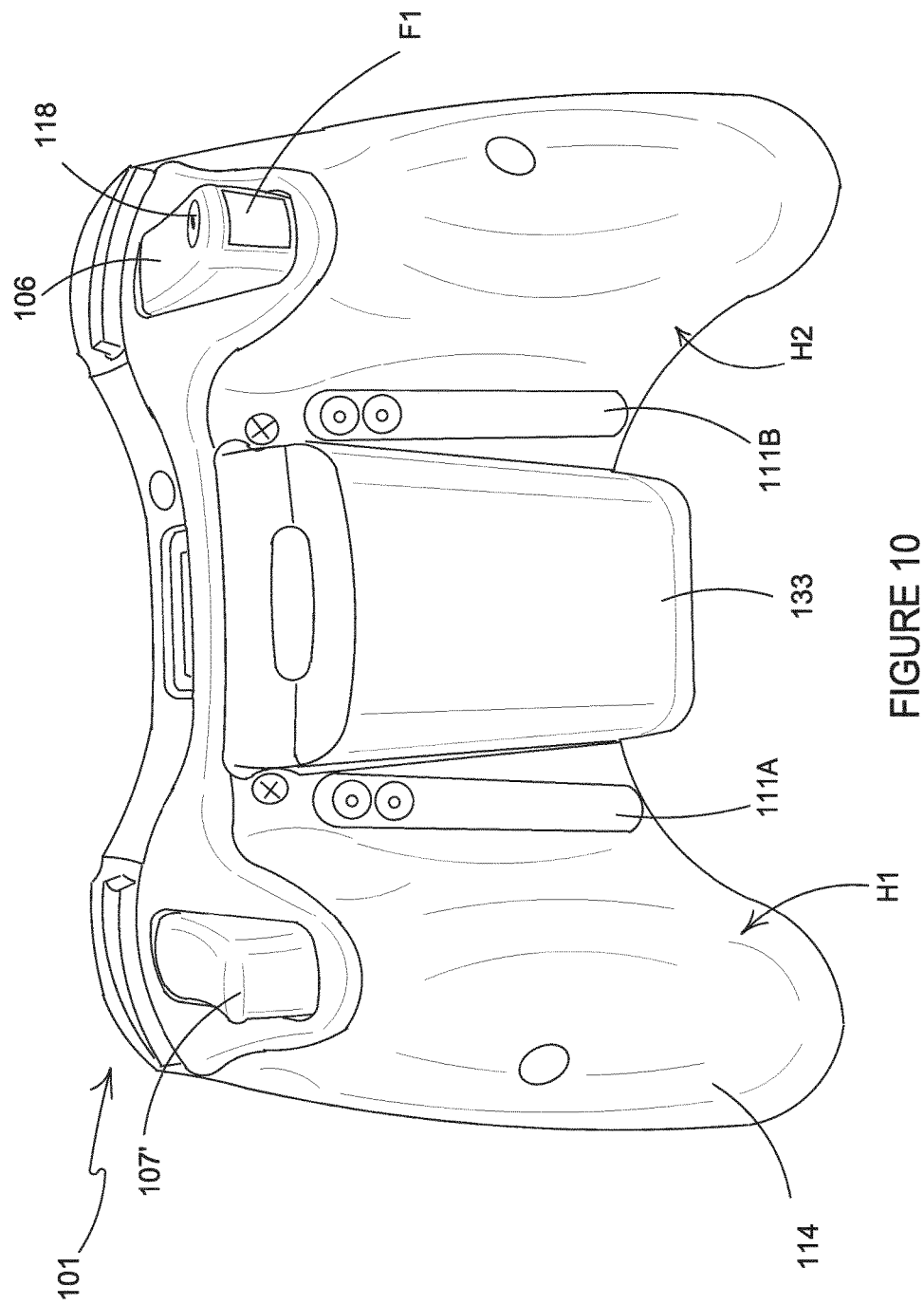
FIG. 10 is a perspective view from below of the rear of a games console controller comprising a trigger mechanism according to the first embodiment.
Figure 11:
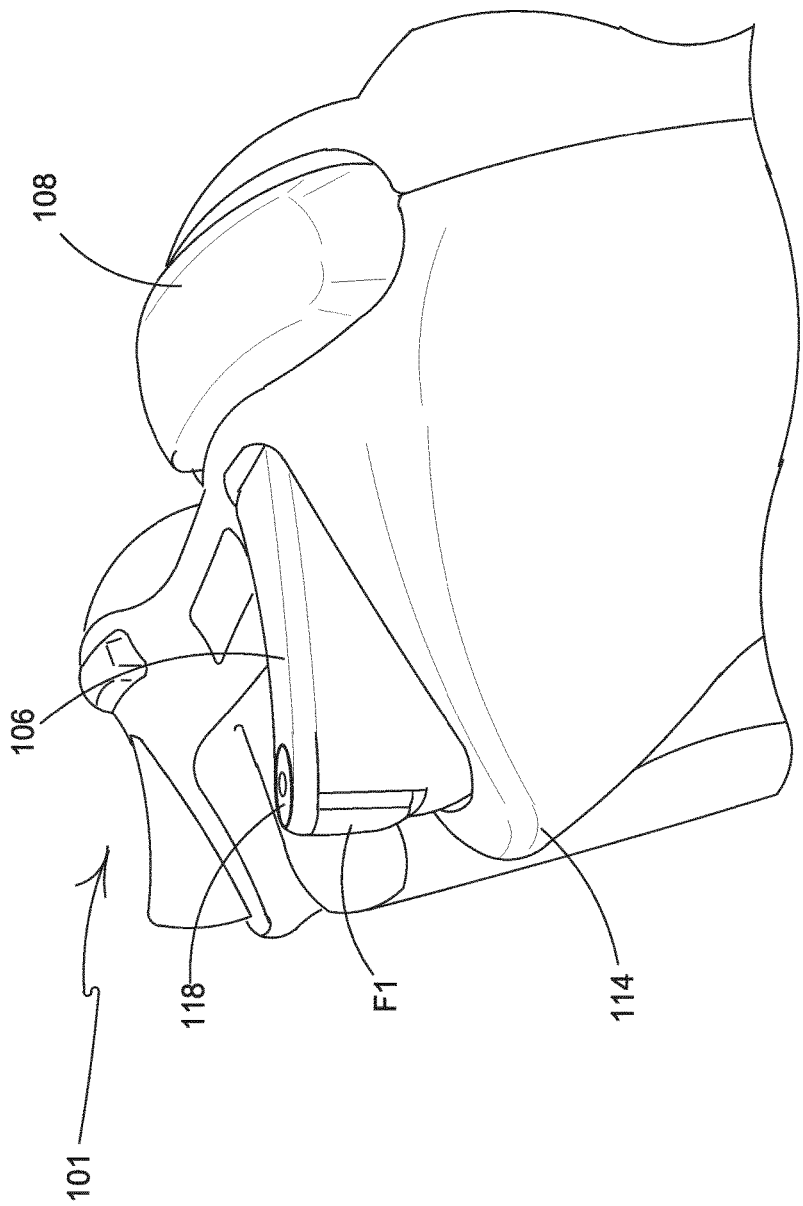
FIG. 11 is a perspective view from the side of the games controller in which the stop mechanism is in a first condition in a disengaged state.
Figure 12:
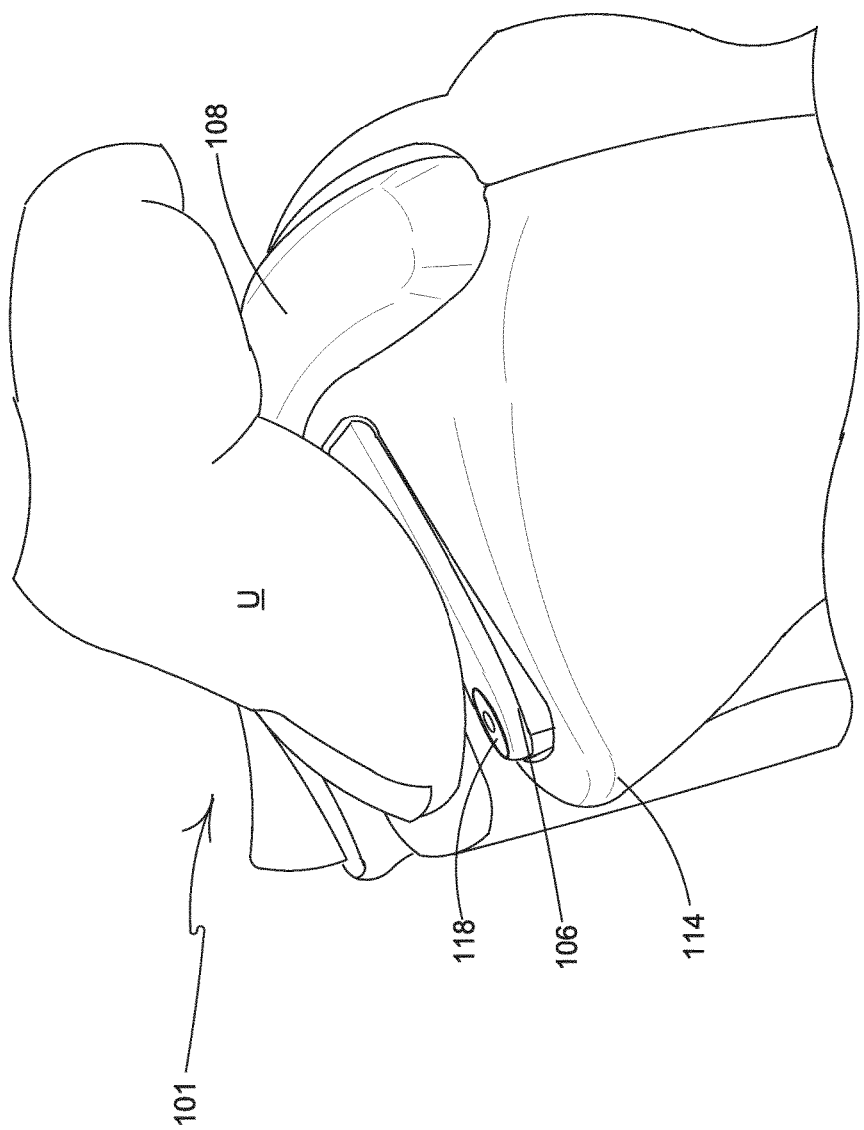
FIG. 12 is a perspective view from the side of the games controller in which the stop mechanism is in a first condition in a depressed state.

FIGS. 4, 10, 11 and 12 illustrate employing a first face F1 of the adjustable stop mechanism 22. FIG. 12 illustrates a user U fully depressing the trigger body 6, 106 into the controller chassis 114. It can be seen in FIG. 11 that the first face F1 does not comprise any projection which would interfere with the controller chassis 114. The first face F1, in effect, provides the bottom wall of the trigger body 6, 106 with a continuous surface such that the aperture in the bottom wall is filled with the first face F1. FIG. 10 also illustrates a conventional trigger body 107' in which there is no trigger range control mechanism.

Figure 13:
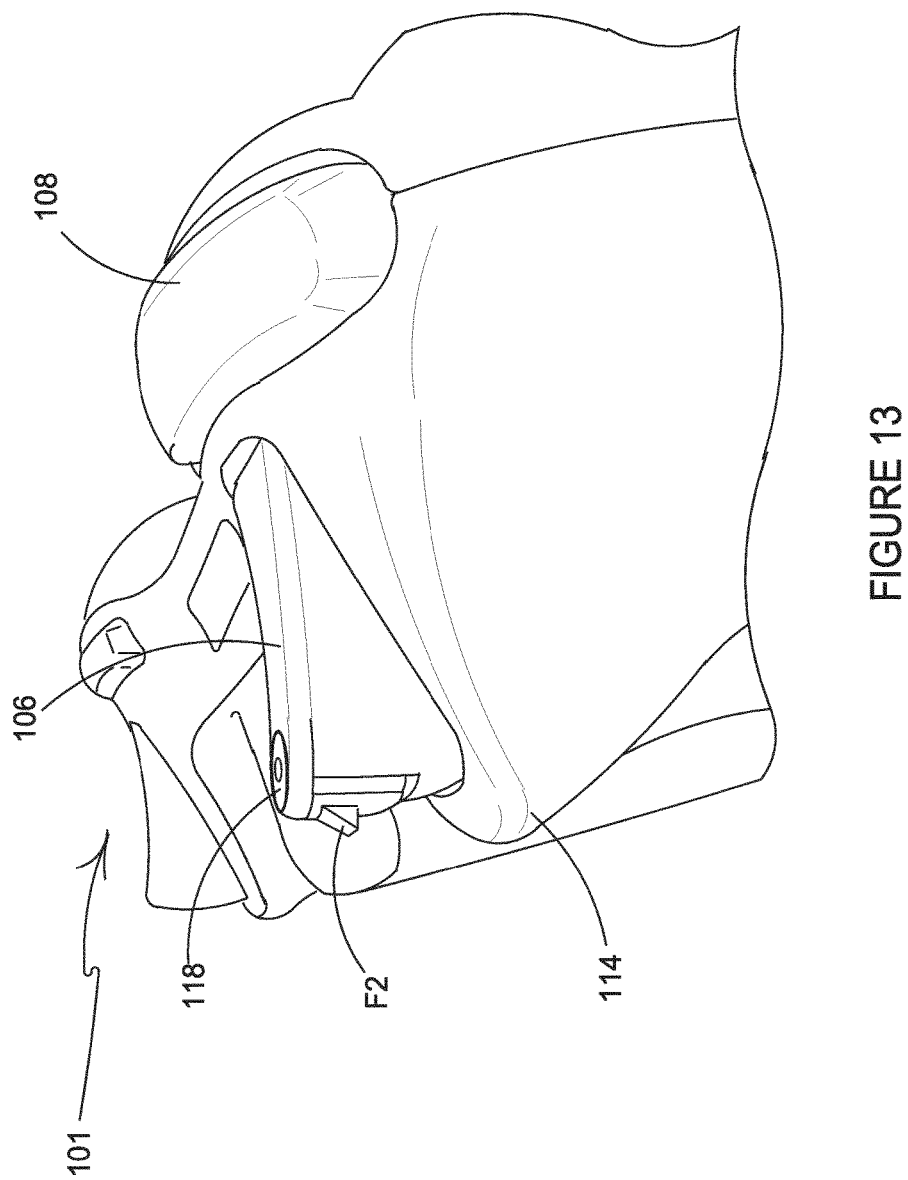
FIG. 13 is a perspective view from the side of the games controller in which the stop mechanism is in a second condition in a disengaged state.
Figure 14:
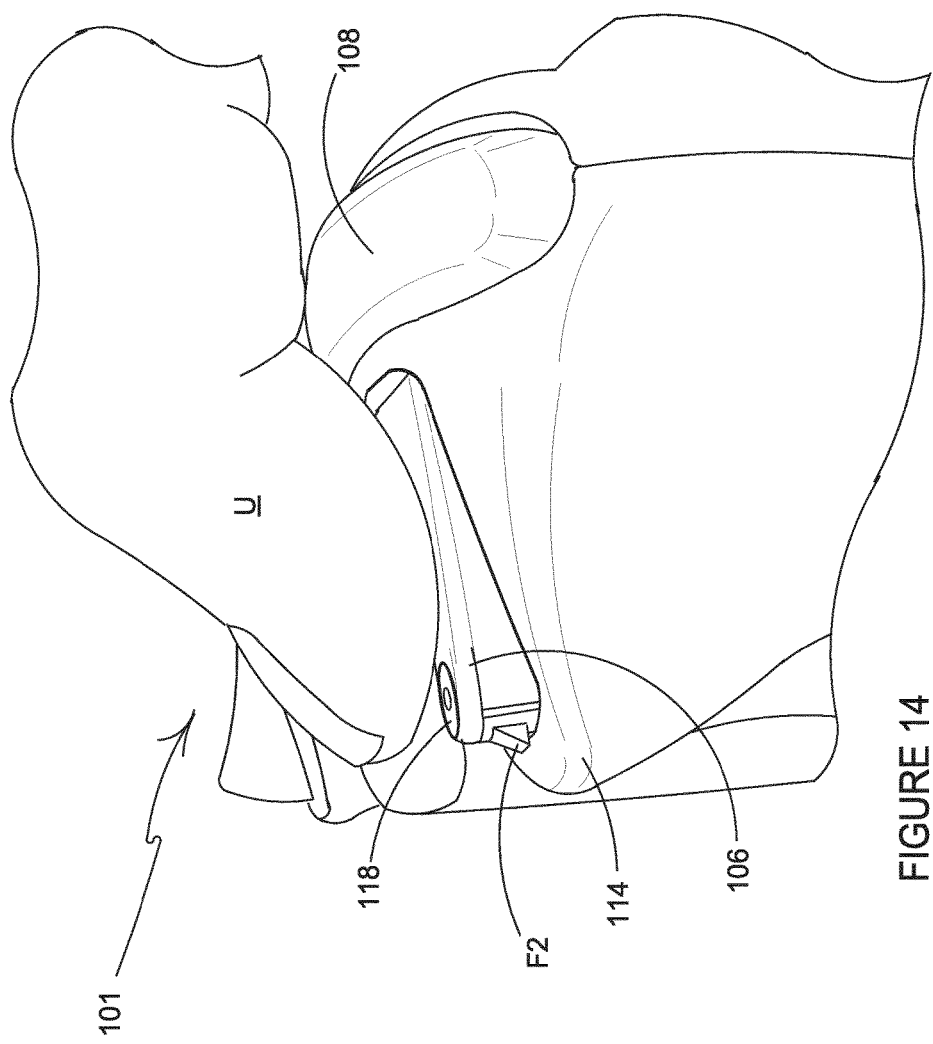
FIG. 14 is a perspective view from the side of the games controller in which the stop mechanism is in a second condition in a depressed state.

FIGS. 5, 13 and 14 illustrate employing a second face F2 of the adjustable stop mechanism 22. The second face F2 comprises a flange or projection 37 which projects outwardly of the trigger body 6, 106. In this way the projection 37 interferes with the travel of the trigger body 6, 106. The projection 37 makes contact with the controller chassis 114, as shown in FIG. 14, preventing further depression of the trigger body 6, 106 by the user U.

Figure 15:
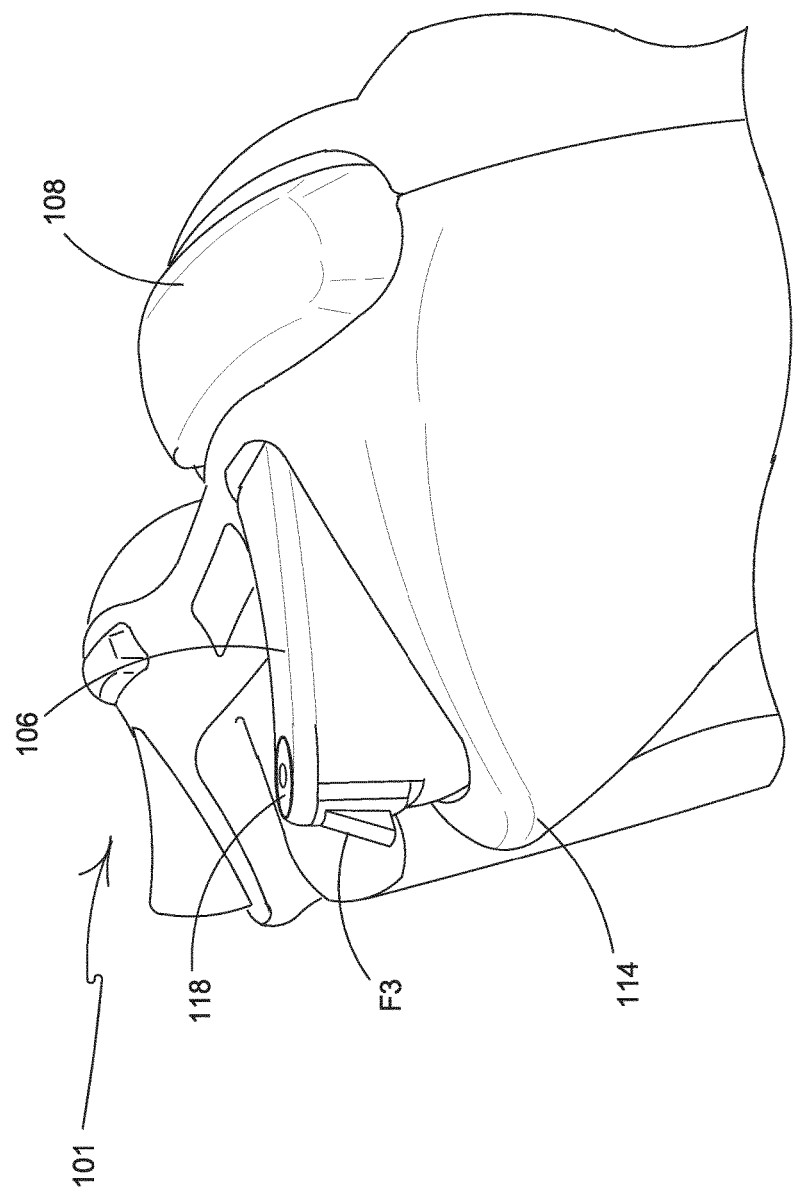
FIG. 15 is a perspective view from the side of the games controller in which the stop mechanism is in a third condition in a disengaged state.
Figure 16:
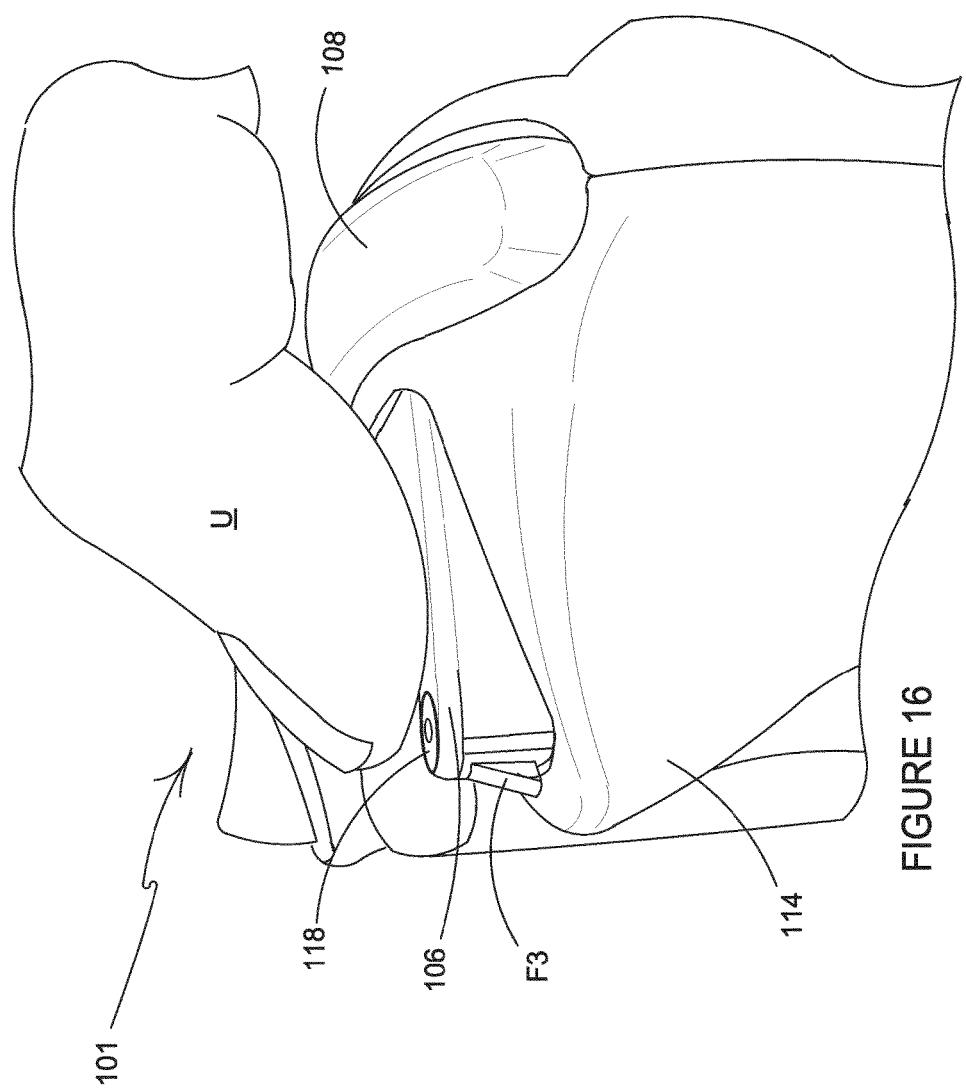
FIG. 16 is a perspective view from the side of the games controller in which the stop mechanism is in a third condition in a depressed state.

FIGS. 6, 15 and 16 illustrate employing a third face F3 of the adjustable stop mechanism 22. The third face F3 comprises a flange or projection 38 which projects outwardly of the trigger body 6, 106. In this way the projection 38 interferes with the travel of the trigger body 6, 106. The projection 38 makes contact with the controller chassis 114, as shown in FIG. 16 preventing further depression of the trigger body 106 by the user U. The projection 38 on the third face F3 is configured to provide a reduction in the degree of travel when compared to that allowed when the second face F2 is employed. This is achieved by arranging the projection 38 of the third face F3 such that it comprises an engaging edge which is disposed closer to the controller chassis 114 than the engaging edge provided by the projection 37 of the second face F2.

One advantage of the present invention is that it allows adjustments to be made to the trigger response; such adjustment could be customised to suit both the nature of the video game that is in use at the time of operation, and the skill of the operator. For example, in combat-style games involving a shooting function, it is often the case that after reaching or passing the command initiation point, no further commands are initiated. In such games, further depression of the trigger body 6 and hence movement of the trigger sensor link arm 31 with respect to the trigger motion sensor 32 serves no useful purpose. Therefore the adjustable stop mechanism 22, which controls the degree of trigger depression, allows the operator to restrict the amount of travel available to the trigger body 6 to one of the predefined degrees of travel provided by the adjustable stop mechanism 22. The adjustable stop mechanism 22, when employing face F2 or face F3, impedes the movement of the trigger body 6 by striking the controller chassis 14. The faces F2 and F3 comprise a flange or projection 37, 38.

Such an adjustment would directly relate to the majority of combat style games or other varieties of firing operations in video games.

The faces F2 and F3 could find application in a variety of other video game genres but for the simplicity of this disclosure, reference is made to combat style games. In some other gaming styles, such as driving or flight simulations, the trigger button 6, 7 is employed for a throttle control command function and/or a braking control command function. In this application, the degree of depression of the trigger body 6 is detected by the trigger motion sensor 32, which is coupled together by the trigger sensor link arm 31. The degree of depression of the trigger body 6 is converted into a signal, which signal directly relates to a command to be executed by the video game, for example the amount of acceleration or braking to be applied. In such games it may be desirable to be able to fully depress the trigger body 6, for example when full depression corresponds to maximum throttle or maximum braking. Restricting travel of the trigger body 6 would restrict the throttle control command function where the degree of travel of the trigger body 6 is proportional to the speed of the vehicle of the simulation. In such gaming styles, the face F1 could be employed to allow full trigger depression. However, it will be appreciated that in such games it may be desirable to control the trigger response by adjustment of the adjustable stop mechanism 22, to allow the operator to restrict the braking and accelerating functions of the game, for example restricting maximum throttle settings and braking level settings for difficult corners. In such scenarios, the second face F2 or third face F3 may be employed.

A further advantage of the present invention is that it minimises the amount of motion an operator's finger must travel, therefore minimising the recovery time after trigger initiation contacts have been made. This allows the operator to rapidly commence command prompt again and again, or to operate different commands more quickly. As the movement that is required to operate commands by depressing the trigger body 6 is reduced to only that which is required, the risks of any related repetitive strain injury acquired due to the repeated movement of the finger when operating the trigger function would be greatly reduced thereby providing a health benefit to users.

The present invention provides a readily adjustable device to restrict the range of movement of the trigger body 6 to one of a plurality of predefined ranges. A further advantage of this embodiment is that the ergonomic design of the controller is not compromised.

Further, it will be appreciated that the adjustable stop mechanism 22 can be removed from the trigger body 6, 7 by unscrewing the screw or bolt 18, 19. A replacement adjustable stop mechanism 22 can be inserted and secured by the screw or bolt 18, 19. The replacement may provide additional or alternative predefined ranges of motion of the trigger body 6, 7. The adjustable stop mechanism 22 may comprise faces which are game specific; that is to say, tailored to suit a particular game.

It can be appreciated that various changes may be made within the scope of the present invention. For example, the size and shape of the features may be adjusted. The adjustable stop mechanism 22 may comprise more or less than three faces, such that it defines a greater or lesser number of predefined ranges of motion.

In some embodiments the adjustable stop mechanism 22 may comprise two detents or projections arranged in opposition to each other, wherein a first one of said detents defines a start position of the trigger body and a second of said detents or projections defines an end stop of the range of motion of the trigger body. In such embodiments it is envisaged that the first one of the detents is disposed internally within the controller chassis when in a deployed condition. In this way the first one of the detents forms an interference fit with an inner surface of the controller chassis. In such embodiments the detent controlling the start position may be mounted upon a separate stopping block or detent chassis to the stopping block or detent chassis upon which the second detent or projection is mounted. In this way, the first and second detents may be individually controlled. It is envisaged that in some embodiments the two separate detent chassis may be mounted upon the same screw thread; in other embodiments, the two separate detent chassis may be mounted upon different screw threads which are individually controllable.

In yet other embodiments the detent chassis and detent may be configured to control the start position of the trigger body only. That is to say, the detent may be configured to engage with an inner surface of the controller chassis such that, in effect, the trigger body is already to some degree, "depressed", before any contact is actually made with the trigger by the operator (player).

Dependent upon the video game being played, it can be necessary to depress the trigger a distance before the trigger initiation point is reached and the command actually acknowledged. This initial movement of the trigger body is unnecessary and wasteful. Adjusting the start position is advantageous since it removes this unnecessary travel, thus reducing the time taken to initiate a command and thereby improving the responsiveness of the trigger. In combat style games, this can simulate a "hair-trigger" function.

It will be recognised that as used herein, directional references such as "top", "bottom", "front", "back", "end", "side", "inner", "outer", "upper" and "lower" do not limit the respective features to such orientation, but merely serve to distinguish these features from one another. While particular embodiments of the invention have been shown and described, numerous variations and alternate embodiments will occur to those skilled in the art without departing from the scope of the present invention.

The invention claimed is:

1. Apparatus for supplying user inputs to a computer program, such as a game program, for controlling the game program, the apparatus comprising a chassis and at least one depressible trigger mechanism, wherein at least a portion of the trigger mechanism protrudes through an aperture in the chassis, the trigger mechanism comprising a trigger body and an adjustable stop, wherein the adjustable stop is mounted in the trigger body and defines a depressible range of the trigger mechanism, the adjustable stop comprising a stopping block having at least two faces, at least one of the faces having a projection extending outwardly from the trigger body for arresting the motion of the trigger mechanism thereby reducing the depressible range of the trigger mechanism, wherein the projection comprises a shoulder which engages with an edge of the chassis defined by the aperture.

2. The apparatus of claim 1 wherein the stopping block comprises a smooth face so as to allow unencumbered motion of the trigger mechanism thereby allowing depression of the trigger mechanism through its full range of motion.

3. The apparatus of claim 1 wherein each of said faces defining a predetermined range of motion of the trigger mechanism.

4. The apparatus of claim 1 wherein the adjustable stop defines a plurality of discrete predefined ranges of motion of the trigger body.

5. The apparatus of claim 1 wherein the stopping block is rotationally mounted within the trigger body.

6. The apparatus of claim 5 wherein the stopping block is securable in a given orientation with respect to the trigger body, such that one of said at least two faces may be presented through the aperture.

7. The apparatus of claim 5 wherein the stopping block is mounted upon a screw thread which screw thread is mounted to the trigger body and wherein rotation of the screw thread causes the stopping block to be frictionally engaged with the trigger body thereby securing the trigger body in a selected orientation.

8. Apparatus for supplying user inputs to a computer program, such as a game program, for controlling the game program, the apparatus comprising at least one depressible trigger mechanism, the trigger mechanism comprising a trigger body having a mechanism for manual adjustment of the stop position of the trigger mechanism mounted therein.

9. A game controller for controlling electronic games, including a housing, at least one depressible trigger at least in part exposed relative to the housing, said at least one depressible trigger being in operational association with electrical circuitry contained within the housing, which electrical circuitry is controlled by depression of the or each depressible trigger for manipulating electrical outputs of the circuitry for controlling electronic games, the trigger comprising a trigger body having a mechanism for manual adjustment of the depressible range of the trigger mounted therein.

10. A game controller for controlling electronic games comprising:
   a controller chassis and an actuator system including:
      an actuator body;
      an actuator mechanism chassis;
      a detent chassis comprising at least one detent for arresting movement of the actuator body to create an end stop to limit the actuator movement;
      wherein the detent chassis is rotationally mounted within the actuator body such that the detent chassis can be rotated between at least a first position in which said at least one detent is in a stowed condition and at least a second position in which one of said at least one detent is in a deployed condition.

11. The game controller according to claim 10 wherein the actuator is a trigger button.

12. The game controller according to claim 10 wherein the detent chassis is removable from the actuator body.

13. A trigger mechanism for a game controller for controlling electronic games comprising:
   a trigger body;
   a trigger mechanism chassis for mounting the trigger body to a game controller;
   a trigger range of travel control mechanism comprising:
      a detent chassis comprising at least one detent for arresting movement of the trigger body to create an end stop to limit the trigger movement;
      wherein the detent chassis is rotationally mounted within the trigger body such that the detent chassis can be rotated between at least a first position in which said at least one detent is in a stowed condition and at least a second position in which one of said at least one detent is in a deployed condition.

14. A method of adjusting the range of movement of a button on a game controller for controlling electronic games comprising:
   providing a game controller including
      a controller chassis;
      a trigger body;
      a trigger mechanism chassis;
      a detent chassis comprising at least one detent for arresting movement of the trigger body to create an end stop to limit the trigger movement;
      wherein the detent chassis is rotationally mounted within the trigger body such that the detent chassis can be rotated between at least a first position in which said at least one detent is in a stowed condition and at least a second position in which one of said at least one detent is in a deployed condition;
   rotating the detent chassis to adjust the position of the end stop.

* * * * *